US010976934B2

(12) United States Patent
Kumar et al.

(10) Patent No.: US 10,976,934 B2
(45) Date of Patent: *Apr. 13, 2021

(54) PRIORITIZING PAGES TO TRANSFER FOR MEMORY SHARING

(71) Applicant: International Business Machines Corporation, Armonk, NY (US)

(72) Inventors: Keerthi B. Kumar, Bangalore (IN); Swetha N. Rao, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/431,685

(22) Filed: Jun. 4, 2019

(65) Prior Publication Data
US 2019/0286340 A1 Sep. 19, 2019

Related U.S. Application Data

(63) Continuation of application No. 15/839,943, filed on Dec. 13, 2017, now Pat. No. 10,353,597, which is a (Continued)

(51) Int. Cl.
G06F 3/06 (2006.01)
G06F 12/08 (2016.01)
G06F 9/50 (2006.01)

(52) U.S. Cl.
CPC .......... G06F 3/0613 (2013.01); G06F 3/0604 (2013.01); G06F 3/0647 (2013.01);
(Continued)

(58) Field of Classification Search
CPC ................. G06F 3/0604; G06F 3/0647; G06F 2212/2542; G06F 3/0683
(Continued)

(56) References Cited

U.S. PATENT DOCUMENTS 6,453,408 B1 * 9/2002 Stuart Fiske ........... G06F 12/08
709/216
8,327,060 B2 12/2012 Heim
(Continued)

FOREIGN PATENT DOCUMENTS

EP 2309387 A1 4/2011

OTHER PUBLICATIONS

"Method or System to Predict Best Donor in AMS Loaning," An IP.com Prior Art Database Technical Disclosure, Disclosed Anonymously, IP.com No. 000224133, IP.com Electronic Publication: Dec. 11, 2012, 16 pages, <http:/fnull/ IPCOM/000224133>.
(Continued)

Primary Examiner — Than Nguyen
(74) Attorney, Agent, or Firm — Robert J. Shatto

(57) ABSTRACT

A method for transferring memory pages to a first and a second page repository identifies pages in a memory sharing operation for transfer to a first page repository and pages in a memory migration operation for transfer to a second page repository. Pages in the memory migration operation may be prepared for transfer prior to transfer of the pages in the memory sharing operation. Transferring pages in the migration operation may remove the need to transfer pages in the memory sharing operation.

20 Claims, 9 Drawing Sheets

Related U.S. Application Data continuation of application No. 14/933,261, filed on Nov. 5, 2015, now Pat. No. 9,875,058.

(52) U.S. Cl.
CPC .......... *G06F 3/0665* (2013.01); *G06F 3/0683* (2013.01); *G06F 9/5016* (2013.01); *G06F 12/08* (2013.01); *G06F 3/067* (2013.01); *G06F 3/0659* (2013.01)

(58) Field of Classification Search
USPC .................................................. 711/160, 148
See application file for complete search history.

(56) References Cited

U.S. PATENT DOCUMENTS

| | | | |
|---|---|---|---|
| 8,458,284 B2 | 6/2013 | Huang | |
| 8,984,240 B2 | 3/2015 | Aslot | |
| 9,753,670 B2 | 5/2017 | Kumar | |
| 9,823,842 B2 | 11/2017 | Gopalan | |
| 9,875,058 B2 | 1/2018 | Kumar | |
| 10,353,597 B2* | 7/2019 | Kumar | G06F 12/08 |
| 2004/0068627 A1 | 4/2004 | Sechrest | |
| 2006/0212671 A1 | 9/2006 | Todd | |
| 2010/0031271 A1 | 2/2010 | Corry | |
| 2011/0099318 A1 | 4/2011 | Hudzia | |
| 2011/0099346 A1 | 4/2011 | Toshine | |
| 2012/0137098 A1 | 5/2012 | Wang | |
| 2012/0179887 A1 | 7/2012 | Maruyama | |
| 2012/0191859 A1 | 7/2012 | Vaidyanathan | |
| 2012/0198187 A1* | 8/2012 | Accapadi | G06F 9/5088 711/160 |
| 2012/0272016 A1 | 10/2012 | Bello | |
| 2012/0317355 A1* | 12/2012 | Ishizaki | G06F 3/0653 711/114 |
| 2013/0067135 A1 | 3/2013 | Pandey | |
| 2013/0166504 A1 | 6/2013 | Varkhedi | |
| 2013/0192203 A1 | 8/2013 | Zemskova | |
| 2013/0242712 A1 | 9/2013 | Inai | |
| 2013/0332692 A1 | 12/2013 | Satoyama | |
| 2014/0281299 A1* | 9/2014 | Duluk, Jr. | G06F 12/1009 711/160 |
| 2014/0281339 A1* | 9/2014 | Satoyama | G06F 12/02 711/170 |
| 2015/0212844 A1 | 7/2015 | Tsirkin | |
| 2015/0248245 A1* | 9/2015 | Sakata | G06F 13/14 711/5 |
| 2015/0378766 A1 | 12/2015 | Beveridge et al. | |
| 2016/0034397 A1 | 2/2016 | Lam | |
| 2017/0012825 A1 | 1/2017 | Chandolu | |
| 2018/0113645 A1 | 4/2018 | Kumar | |

OTHER PUBLICATIONS

List of IBM Patents or Patent Applications Treated as Related, Jun. 4, 2019, 2 pages.

* cited by examiner

PRIORITIZING PAGES TO TRANSFER FOR MEMORY SHARING

BACKGROUND

The present disclosure relates to transferring contents of memory pages in a computer to page repositories, such as another memory, a paging device, an operating system, or another computer. More particularly, the disclosure relates to preparing transfer of the pages to the first and second page repositories.

SUMMARY

A method for transferring the contents of pages in a memory includes identifying two sets of memory pages for transferring to two page repositories. The first set of memory pages may be pages to transfer in a memory sharing operation. The second set of memory pages may be included in a memory migration operation. The method identifies a first page in the first set and a second page in the second set, and determines that the second page may be transferred to the second page repository prior to transferring the first page to the first page repository. The determination is based on the second page being included in the memory migration operation and the first page being included in the memory sharing operation. The determination is also based on one or more characteristics of a first affinity domain that the first set of memory pages is included within, where the first affinity domain consists of one or more processors and one or more pages of memory, and based on one or more characteristics of a second affinity domain that the second set of memory pages is included within, where the second affinity domain consists of one or more processors and one or more pages of memory. The method prepares transfer of the second page to occur prior to transfer of the first page.

In an aspect of the method transferring the second page may make the second page available in the memory for sharing in the memory sharing operation. The method may determine that the first page need not be transferred to the first page repository. The determination is based on transferring the second page making the second page available in the memory for the memory sharing operation. The method removes the first page from the first set of memory pages.

A computer program product for performing the method comprises a computer readable storage medium having programming instructions executable by a processor to perform the method. A system may be configured to perform the method.

BRIEF DESCRIPTION OF THE DRAWINGS

The drawings included in the present application are incorporated into, and form part of, the specification. The drawings illustrate embodiments of the present disclosure and, along with the description, serve to explain the principles of the disclosure.

Figure 1:
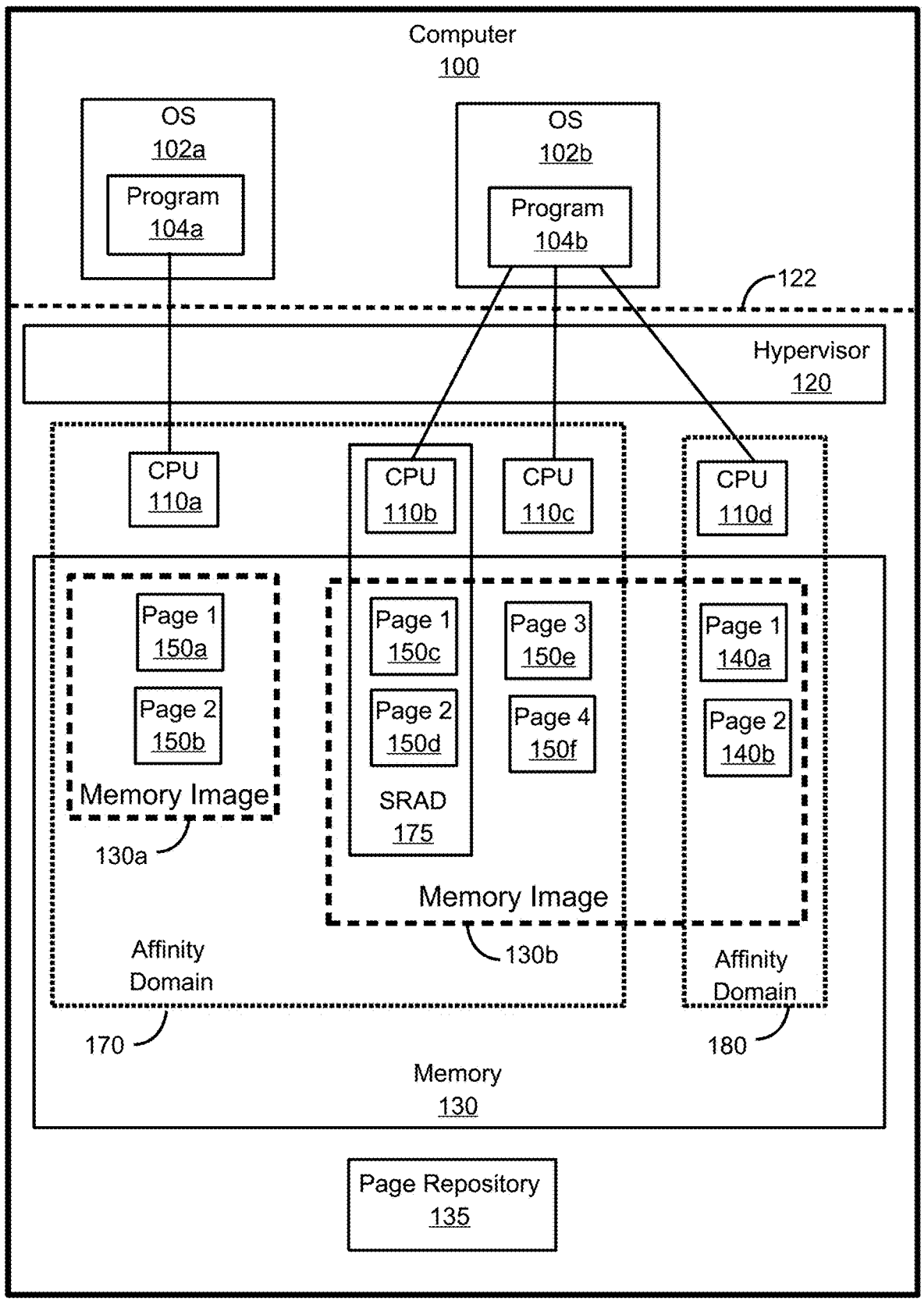
FIG. 1 is a block diagram illustrating a computer including a page repository, according to aspects of the disclosure.

While the disclosure is amenable to various modifications and alternative forms, specifics thereof have been shown by way of example in the drawings and will be described in detail. It should be understood, however, that the intention is not to limit the disclosure to the particular embodiments described. Rather, the intention is to cover all modifications, equivalents, and alternatives falling within the spirit and scope of the disclosure.

DETAILED DESCRIPTION

Aspects of the present disclosure relate to transferring pages from a memory to a first page repository. More particular aspects relate to identifying priority pages within a memory and preparing transfer of the priority pages to the first page repository to occur prior to transferring other memory pages identified to transfer. Other aspects relate to identifying a first set of pages within a memory to transfer to a first page repository and identifying a second set of pages within a memory to a second page repository and preparing transfer of pages in the second set of pages to occur prior to transferring pages to the first page repository. More particular aspects relate to determining that transferring pages to the second page repository may avoid transferring pages within the first set of pages.

Computers may feature transferring the contents of pages in a memory to a "page repository". Computers that feature such transfer capabilities include, for example, desktop, laptop, or server computers; mobile devices such as tablets or phones; network gateways or routers; IO adapters, including virtualized IO adapters; or other devices that include a memory or storage medium. Such computers also may feature one or more operating systems, and an operating system may transfer memory pages to a page repository. Computers may feature a hypervisor, which may be a program that manages the operation of a plurality of programs or operating systems, such as in a partitioned computer system. A hypervisor may transfer pages of a memory to a page repository.

For purposes of understanding the disclosure, a "memory" refers to any storage medium of a computer, such as a memory cache, a main memory, a flash memory, or a removable memory (e.g., CD, DVD, or flash drive). A variety of devices or components of a computer, or computing system, may operate as a page repository, such as pages in the same or another memory, a storage medium (e.g., CD or DVD, flash memory, etc.), an IO adapter, a device included in or coupled to an IO adapter, a virtualized form of an IO adapter or device, a network attached storage (NAS) device, an operating system (OS), or another computer. A program (e.g., an application or a workload partition in an operating system), an operating system (e.g., a virtual machine operating in a computer), or a hypervisor may operate as a page repository. A computer may accomplish transferring the pages to a page repository in a variety of means, such as by hardware devices (e.g., network interfaces, IO adapters, and DMA devices), firmware programs (e.g., BIOS, UEFI, or a hypervisor), software programs (e.g., an operating system or hypervisor), another computer, or a variety of combinations of these.

Within the scope of the disclosure, a program may be any unit of computer instructions that accomplishes a particular function. For example, a program may be, or may be a component of, an application, an operating system, a hypervisor, a function of a computer embodied in firmware; or applications, widgets, or other forms of programs operating on a mobile device. A program may divide its execution into one or more simultaneously multi-threaded (SMT) "program threads", and a program thread may execute on different processors of a computer than other program threads comprising the same program. References within the disclosure to a "program" refer implicitly to any one or more of the program threads that may comprise a program, and generally to any embodiment of a program capable of executing in a computer.

A computer may transfer memory pages to a page repository for a variety of purposes. For example, a virtual memory function of an OS may transfer ("page-out") pages in a main memory to a paging device (e.g., a disk drive or other storage medium) to make the pages in the main memory available to a second program. An OS may transfer pages of a memory to a paging device to save (or, "checkpoint") the memory state of a program. A computer may feature a "workload partition" encapsulating the operation of one or more application programs within an OS. The computer may also feature transferring a workload executing within a first OS to execute within a second OS. Transferring the workload between OSes may include memory migration, transferring the contents of memory pages allocated to the workload in the first OS to other memory pages that are allocated to the workload in the second OS.

Similarly, a computer may feature operating system partitions (e.g., virtual machines) encapsulating an OS, and OSes within the partitions may share the resources of the computer. A hypervisor may be included in a computer to manage the sharing of resources among the OSes, or to manage the execution of the OSes. A hypervisor may transfer pages to a paging device (or, to another OS) to save (or, "checkpoint") the memory state of an operating system.

In another example, a computer may feature memory sharing, in which the computer may share memory pages among a plurality of OS partitions operating in the computer. In a memory sharing operation, a computer, or a hypervisor operating in the computer, may transfer memory pages in use by a first OS to a paging device (or, to another OS) to make the memory pages available to a second OS. A computer may also feature partition migration—transferring execution of an OS—from a first computer to a second computer. A hypervisor may perform the partition migration, or may perform the partition migration in combination with another OS, such as a virtual IO server OS. A partition migration may include memory migration, transferring memory pages allocated to an OS in the first computer to other pages in the memory allocated to the OS in the second computer.

A computer may transfer memory pages to a page repository while an OS or program is continuing to execute (while the OS or program is "live"), such as in a live migration (LM) operation or in an "active" memory sharing (AMS) operation. A computer may transfer pages in use by an OS or program such that the OS or program is unaware that the pages are undergoing the transfer. A live (e.g., executing) program may modify a page after a computer has initially transferred that page to a page repository, and this may require that the computer transfer that page a second time prior to releasing the page for other uses. Transferring pages more than once may degrade the performance of the program or the computer overall. Transferring pages less likely to be modified by an executing program may avoid transferring a particular page more than once, and thereby avoid possible related performance degradation.

Selecting pages less likely to be modified may utilize statistical metrics relating to access or modifications of a memory page, such as least recently used (LRU) or least frequently used (LFU). Such metrics may be used additionally to determine an order in which to transfer the pages. However, such metrics at times in the overall operation of a computer, or with regard to certain programs, may not be precise indicators of likelihood that a page will be modified. Other metrics, such as which program last accessed a page and from what processor that access occurred, may improve selecting pages less likely to be modified.

A processor may have a suspended state, which may include any state of a processor such that it is not executing instructions to perform useful work, such as executing "idle" or "no-op" loops. A processor may have a "folded" type of a suspended state in which a processor is placed in a low power state to save energy. For purposes of the disclosure, references to "suspended" state of a processor include a folded type of processor state. A program, an operating system, or a hypervisor may place a processor in a suspended state. A page in a memory that was last accessed by processor in a suspended state may be less likely to be modified than pages last accessed or in use by active or running processors. Similarly, a program may be in an idle state, and pages last accessed by an idle program may be less likely to be modified than pages last accessed by an active program.

A computer may include or be coupled to a first and a second page repository and may transfer memory pages concurrently to both repositories. For example, shared pages may be transferred to a first page repository, such as in an AMS operation. Some pages, which may include shared pages, may be transferred to a second page repository, such as a second computer in an LM operation. If the computer initially transfers pages to the first page repository (e.g., to satisfy a need for pages in a memory sharing operation), the computer may have to transfer the pages back to the memory ("page-in") in order to then transfer those pages to the second page repository (e.g., a second computer in an LM operation). Paging-out and paging-in pages from the first repository, in order to transfer them to the second repository, can be inefficient and may degrade program or overall computer performance. Additionally, transferring the pages to the second repository, before transferring those pages to the first repository, may avoid transferring the pages to the first repository at all. For example, pages to be migrated in an LM operation may be transferred from the memory and may make memory pages available for memory sharing, and may avoid transferring pages from the memory specifically for sharing.

Accordingly, aspects of the disclosure relate to structures and methods for identifying pages to transfer first (priority pages) to a page repository, in various memory transfer operations of a computer or computing system.

FIG. 1 illustrates a computer 100, which may include one or more processors (hereinafter, CPUs), such as CPUs 110a, 110b, 110c and 110d. CPUs may be a singular CPU (e.g., a single core CPU), may be a thread of a simultaneously multi-threaded (SMT) CPU, or may be a virtual CPU, such as a fractional allocation of a physical CPU or SMT CPU. The computer 100 may include a memory 130, and the memory 130 may be organized as pages, such as pages 150a through 150f and 140a and 140b.

A computer may feature affinity domains, such as affinity domains 170 and 180, in which particular CPUs and particular pages of a memory are included in one affinity domain that may exclude other processors and other pages of memory. A property of an interconnection structure or other relationship between certain CPUs and certain memory pages, not shared by all CPUs and memory pages, may determine an affinity domain. For example, CPUs 110a, 110b, and 110c may have a low latency interconnection to particular memory pages, such as pages 150a through 150f, while CPU 110d may have a higher latency interconnection to those pages. Similarly, CPU 110d may have a low latency interconnection to memory pages 140a and 140b, while CPUs 110a, 110b, and 110c may have a high latency interconnection to pages 140a and 140b. Correspondingly, CPUs 110a, 110b, and 110c may be included in an affinity domain 170 with pages 150a through 150f, while CPU 110d may be included in an affinity domain 180 with pages 140a and 140b. Affinity domain 170 may exclude CPU 110d, and affinity domain 180 may exclude CPUs 110a, 110b, and 110c.

It will be apparent to one of ordinary skill in the art that various embodiments may determine an affinity domain based on other physical or logical organizations of CPUs and memory suitable to the operation of a computer or programs operating within that computer.

A computer 100 may have one or more OSes, such as OS 102a and 102b, operating within it, and an OS may have an identifier that distinguishes that OS from other OSes. An OS may utilize particular CPUs and particular memory pages included in an affinity domain. For example, OS 102a may utilize CPU 110a and pages 150a and 150b included in affinity domain 170. OS 102b may utilize CPU 110b and 110c and pages 150c through 150f, also included in affinity domain 170. OS 102b may also utilize CPU 110d and pages 140a and 140b included in affinity domain 180. The pages utilized by an OS may form a memory image, such as memory image 130a including the pages utilized by OS 102a, or memory image 130b including the pages utilized by OS 102b.

An OS may include various programs operating within it, such as program 104a operating in OS 102a and program 104b operating in OS 102b. A program may have an identifier uniquely distinguishing it from other programs within an OS. A program may have an idle state, which may represent that a program is suspended from further execution or has terminated. An idle state may also represent that a program is awaiting completion of some event, such as a release of an SMT thread lock or completion of an IO operation. The pages utilized by a program, or by a program thread, may form a memory image, such as memory image 130a including the pages utilized by program 104a, and memory image 130b including the pages utilized by program 104b.

The computer 100 includes a hypervisor 120, and the hypervisor 120 may manage the operations of the various CPU and memory resources of the computer 100. A hypervisor 120 may manage allocation of CPUs or memory pages to the various OSes, such as OS 102a and 102b, or programs, such as programs 104a or 104b, operating in the computer 100. For example, the hypervisor 120 may allocate CPUs 110b, 110c, and 110d to OS 102b. OS 102b may allocate CPUs 110b, 110c, and 110d to program 104b. The hypervisor 120 includes a hypervisor interface 122, and the OSes or programs and the hypervisor 120 may communicate utilizing the hypervisor interface 122. In other embodiments, the computer 100, or another component thereof, or an OS may allocate a CPU or memory to a program for program execution.

A program may utilize pages in the affinity domain of CPUs allocated to the program, and may exclude pages in other affinity domains from use by that program. For example, a program may be allocated a particular processor and may determine a scheduler resource allocation domain (SRAD) that includes that processor and certain memory pages that are within an affinity domain having that processor, such as SRAD 175 in affinity domain 170. When executing on a processor in a particular SRAD, a program may limit memory pages it uses to only pages within that SRAD. For example, program 104b may execute on CPU 110b and program 104b may determine to use only pages 150c and 150d within SRAD 175 when executing on processor 110b. Program 104b may further determine not to use pages in other affinity domains, such as pages 140a or 140b in affinity domain 180, while executing on processor 110b.

A CPU may have a suspended state, which may be any state in which the CPU is not executing instructions, or is executing instructions that may not perform useful work but may maintain an active execution state of the CPU (e.g., looping while awaiting dispatch of a program). A CPU, such as 110a, 110b, 110c, or 110d, may have a "folded" kind of suspended state in which the CPU is in a low power state not executing instructions. A computer, or a program may place a CPU into a suspended state at times when that CPU may not be actively utilized (e.g., is idle). For example, OS 102b or program 104b may suspend CPU 110b while executing programs on another CPU, such as CPU 110c, and CPU 110b may be idle. A hypervisor 120 may suspend CPU 110b, or a virtual CPU executing within CPU 110b, when the CPU 110b is idle. A computer 100 may suspend a CPU under conditions in which execution can be consolidated onto fewer CPUs and the unused CPU may be suspended. For example, CPUs 110b and 110c may have sufficient capacity to execute program 104b and OS 102b may dispatch program 104b to execute on CPUs 110b and 110c and may place CPU 110d in a suspended state.

A page repository for transferring pages in a computer, such as page repository 135 in computer 100, may be a disk drive or other storage medium, or a virtualized form of these, and may be a component of the computer 100. A page repository 135 may be another device or component coupled to computer 100, such as a device connected to an IO adapter (e.g., SCSI or Fiber Channel IO adapter) that is a component of (e.g., plugged into) the computer 100. A page repository 135 may be a network attached storage (NAS) device or a second computer. An OS may operate as a page repository. For example, OS 102a may be a virtual IO server and operate as a page repository 135 to receive pages in use by OS 102b. An OS (not shown) operating in another computer (also not shown) coupled to computer 100 may act as a page repository 135.

For further understanding the disclosure, "a computer transferring memory pages" includes components of the computer (e.g., hardware devices, an operating system, a hypervisor, or other programs) selecting or transferring the pages. An OS 102a or 102b may transfer memory pages to the page repository and may do so at a time or in a manner that a program using a memory page is unaware that the page has been transferred to the page repository. A hypervisor 120 operating in the computer 100 may transfer memory pages to the page repository. The hypervisor 120 may perform the transfer at a time, or in a manner, that an OS, or a program, using a memory page is unaware that the page has been transferred to the page repository. Another device (e.g., a second computer) coupled to, or in communication, with computer 100 may transfer memory pages to a page repository.

The pages of memory associated with an OS may represent a memory image of the OS and the programs executing within it. A memory image may be the object of an operation transferring memory pages to a page repository. For example, memory image 130a may contain the memory pages associated with OS 102a, and memory image 130b may contain the memory pages associated with OS 102b. An LM operation may transfer the memory image 130b to a page repository 135. A memory image may represent only pages actually in the memory 130, or may represent a totality of pages associated with or in use by an OS or program, including pages not residing in the memory 130, such as pages paged-out to another page repository or paged-out to page repository 135.

Figure 2:
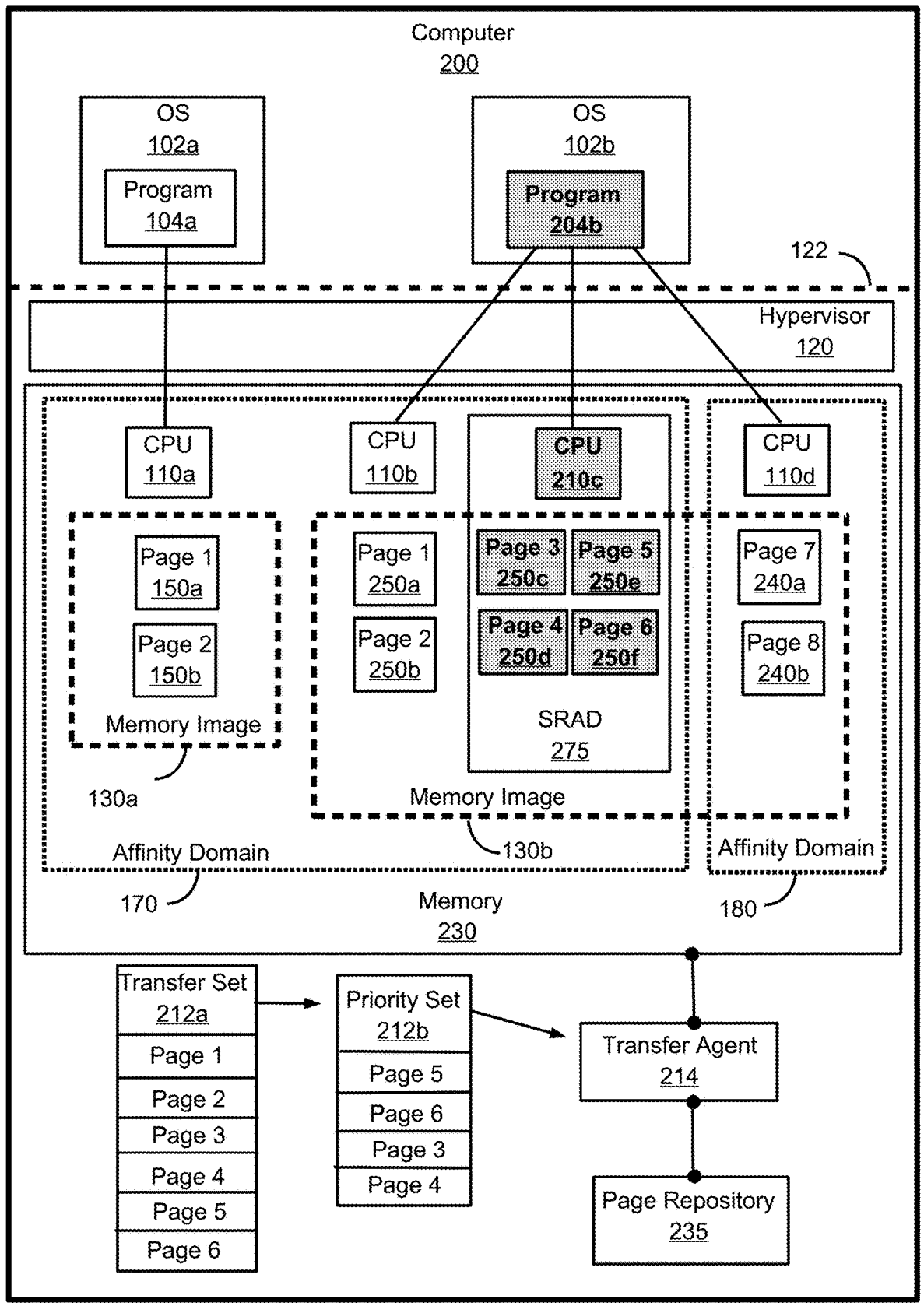
FIG. 2 is a block diagram illustrating a computer including priority memory pages to transfer to a page repository, according to aspects of the disclosure.

FIG. 2 illustrates a computer 200 configured, according to aspects of the disclosure, to transfer pages from the computer memory 230 to a page repository 235. Computer 200 includes a transfer agent 214, a set of pages to transfer 212a and a priority set 212b of pages to transfer. Computer 200 may transfer pages in these sets to the page repository 235. The pages may be pages included in a memory image 130b; for example, memory image 130b may contain pages of an OS 102b migrating in an LM operation. As another example, pages 250a and 250b may be pages in affinity domain 170 to transfer in an AMS operation to make pages 250a and 250b available to OS 102a.

A transfer agent 214 may act to transfer the pages from memory 230 to the page repository 235. A transfer agent may communicatively couple the memory 230 to the page repository 235 (e.g., directly, by means of an intermediary device, or by means of an IO adapter). A transfer agent 214 may be a component of the computer 200 (e.g., hardware or firmware, or a combination thereof), a hypervisor 120, or an OS 102a and/or 102b. A transfer agent 214 may be embodied as a combination of components of the computer 200, such as a hypervisor 120 or an OS 102a and/or 102b interacting to perform the function of a transfer agent.

A transfer agent 214 may be embodied in a second computer (not shown) or a device (also not shown) coupled to or in communication with the computer 200 and the page repository 235, or may in some other manner have access to the memory 230 and page repository 235. A transfer agent 214 may be wholly or partially embodied in a page repository 235. For example, a page repository 235 may be embodied as a VM operating in a second computer and communicating with computer 200 to access a copy of the memory pages to be transferred.

A transfer agent may identify a set of pages to transfer, or may receive a list or description of a set of pages to transfer (e.g., an OS may provide a set of pages to a transfer agent), as represented by transfer set 212a including pages one through six. For example, a hypervisor or VM may act as a transfer agent and receive a set of pages to transfer from an OS. The transfer agent may prepare to transfer the pages in a particular order, such as first transferring page 1 and then transferring page 2. The order may be based on metrics associated with each page, such as LRU or LFU, may be based on criteria such as ascending or descending page address, may be based on the inclusion of pages in particular affinity domains, or may be based on some other criteria. A variety of criteria to order pages for transfer may be advantageous to a particular embodiment of a computer 200.

The computer 200 may identify certain pages within the set of pages to transfer, or certain pages within the memory 230 as a whole, that may be transferred prior to other pages. For purposes of understanding the disclosure, with regard to identifying pages to transfer, or transferring pages, references to "computer 200" include a particular component (e.g., a hypervisor, firmware, or an OS) of computer 200 or a combination of components of computer 200, including a transfer agent 214 or a component thereof.

By way of example, the computer 200 may select pages 250a, 250b, 250c, 250d, 250e, and 250f, in memory image 130b, to transfer to page repository 235, and may initially include all of these pages in a transfer set 212a. For example, these pages may be included in a memory image 130b to migrate in an LM operation and in which page repository 235 may be another computer. In another example, these pages may be selected from memory image 130b to share with another OS, such as 102a, in a memory sharing operation, and page repository 235 may be a paging device or may be a VM. The pages may be ordered for transfer from page one to page six (page 250a through 250f).

The computer 200 may determine that the pages are included in an affinity domain 170, or are included in an SRAD, such as SRAD 275, that includes CPU 210c. The computer 200 may determine that pages 250e and 250f have not been accessed by any program, or have been last accessed by a program that is not executing on any CPU within computer 200 (e.g., the program is in an idle state). Alternatively, the computer 200 may determine that pages 250e and 250f were last referenced by CPU 210c and that CPU 210c is in a suspended state.

Correspondingly the computer 200 may identify pages 250e and 250f as less likely to be modified than other pages within the transfer set 212a and may determine to transfer pages 250e or 250f, or both, prior to transferring other pages (e.g., 250a, 250b, 250c, or 250d) in transfer set 212a.

Similarly, the computer 200 may determine that a page within the set of pages to transfer, such as page 250c, was last referenced by program 204b and that program 204b is executing on a CPU, such as CPU 110d, that is not included in affinity domain 170, or not included in SRAD 275. Correspondingly the computer 200 may identify page 250c as less likely to be modified than pages 250d, 250a, or 250b within the transfer set 212a and may determine to transfer page 250c prior to transferring pages 250d, 250a, or 250b.

In another alternative, computer 200 may determine that page 250d was last referenced by program 204b and that program 204b is executing on a CPU not included in affinity domain 170, or not included in SRAD 275. Correspondingly the computer 200 may identify page 250d as less likely to be modified than pages 250a or 250b within the transfer set 212a and may determine to transfer page 250d prior to transferring pages 250a or 250b.

Figure 3:
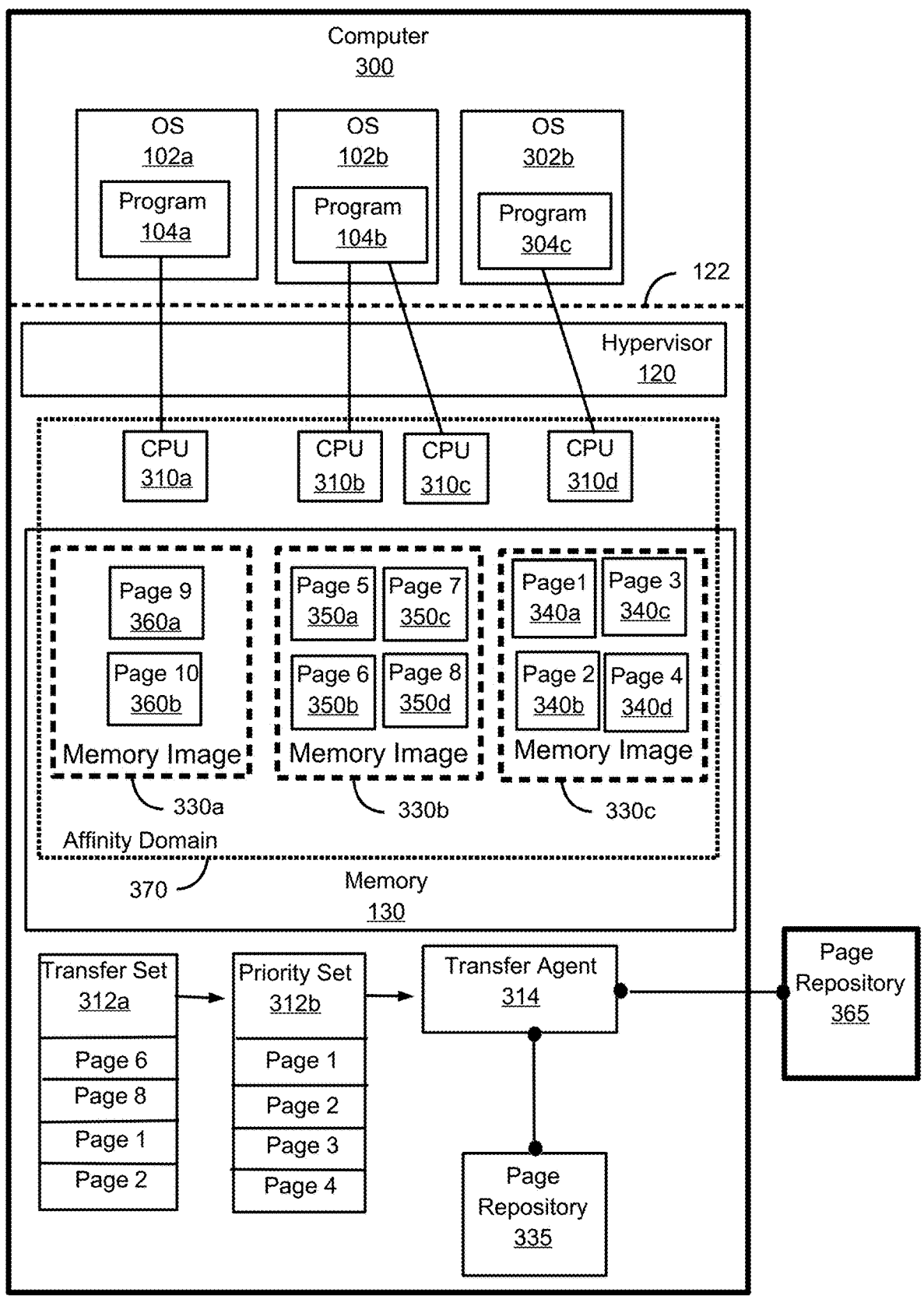
FIG. 3 is a block diagram illustrating a computer including memory pages to transfer to two page repositories, according to aspects of the disclosure.

FIG. 3 illustrates a computer 300 configured, according to aspects of the disclosure, to transfer pages to a page repository 335 and to a page repository 365. The computer 300 includes OSes 102a, 102b, and 302b, and the OSes include programs 104a in OS 102a, 104b in OS 102b, and 304c in OS 302b. Computer 300 includes a hypervisor 120 and a hypervisor interface 122. Computer 300 includes CPUs 310a, 310b, 310c, and 310d, and a memory 130, and the memory is organized into pages, such as pages 350a through 350d, 340a through 340d, and 360a and 360b. Affinity domain 370 includes the four CPUs 310a through 310d, and memory pages one through ten (340a through 340d, 350a through 350d, and 360a and 360b).

Pages in the memory may be included in a memory image of a program or OS. Memory image 330a may be associated with OS 102a or program 104a and includes pages 360a and 360b. Memory image 330b may be associated with OS 102b or program 104b and includes pages 350a through 350d. Memory image 330c may be associated with OS 302b or program 304c and includes pages 340a through 340d. Memory images 330a, 330b, and 330c are in affinity domain 370.

Page repository 335 may be included in computer 300, or may be communicatively coupled to computer 300. Similarly, page repository 365 may be included in computer 300, or may be communicatively coupled to computer 300. In an embodiment, page repository 335 may be, for example, a paging device or a VM to receive pages in a memory sharing operation. Page repository 365 may be a second computer (not shown), or may be a component of a second computer, and may receive pages migrated in an LM operation. A second computer having page repository 365 may be connected to computer 300 in a variety of ways, including by means of a network connection or a directly cabled connection. In another embodiment page repository 335 or page repository 365 may be a virtual computer (not shown) included in computer 300, and the virtualized computer may be logically of the form of a computer in the manner of the disclosure. In embodiments a page repository 335 or 365 may be a physical or virtual device of the computer 300.

Computer 300 may include a transfer agent 314 in the manner of the disclosure. The transfer agent may be communicatively coupled to the page repository 335, and may be communicatively coupled to the page repository 365. The transfer agent 314 may identify memory pages to transfer to both page repository 335 and to page repository 365. A transfer agent 314 may identify a set of pages to transfer to page repository 335, and may include these pages in a transfer set 312a. For example, in an embodiment pages 340a and 340b and 350b and 350d (pages 1, 2, 6, and 8, respectively, in transfer set 312a) may be a set of pages in the memory 130 to transfer to page repository 335 in an AMS operation. Memory image 330c may be associated with OS 302b, and OS 302b may be migrating to a second computer (embodying page repository 365) in an LM operation. Pages 340a, 340b, 340c, and 340d (collectively, pages 340), accordingly, may be identified for transfer to the second computer.

The transfer agent 314 may determine to include pages 340 in a priority set 312b to transfer prior to transferring pages in transfer set 312a. Transferring pages 340 in priority set 312b (e.g. as part of an LM operation) may make the pages in memory 130 corresponding to pages 340 available for other purposes, such as sharing in an AMS operation. Correspondingly, as a result of identifying pages in the priority set 312b to transfer, the transfer agent 314 may determine that pages 340a, 340b, 350b, and 350d (pages 1, 2, 6, and 8, respectively, in transfer set 312a) need not be transferred (e.g., for AMS sharing). In particular, pages 340a and 340b may not need to be transferred to page repository 335 if transferring them first to page repository 365 makes the corresponding pages in memory 130 available (e.g., for sharing). Similarly, transferring pages 340c and 340d to page repository 365 may make the corresponding pages in memory 130 available (e.g., for sharing), and pages 350b and 350d may not need, then, to be transferred to page repository 335. The transfer agent may, in response, remove pages 340a, 340b, 350b, and 350d from the transfer set 312a.

It would be evident to one of ordinary skill in the art that computer 300 may include a plurality of transfer sets, and a transfer agent may process the transfer sets each individually, or may process the totality of transfer sets as logically one transfer set. It would be further apparent to one of ordinary skill in the art that computer 300 may include a plurality of priority sets and a transfer agent may process the plurality of priority sets each individually, or may process the totality of priority sets as logically one priority set.

Figure 4:
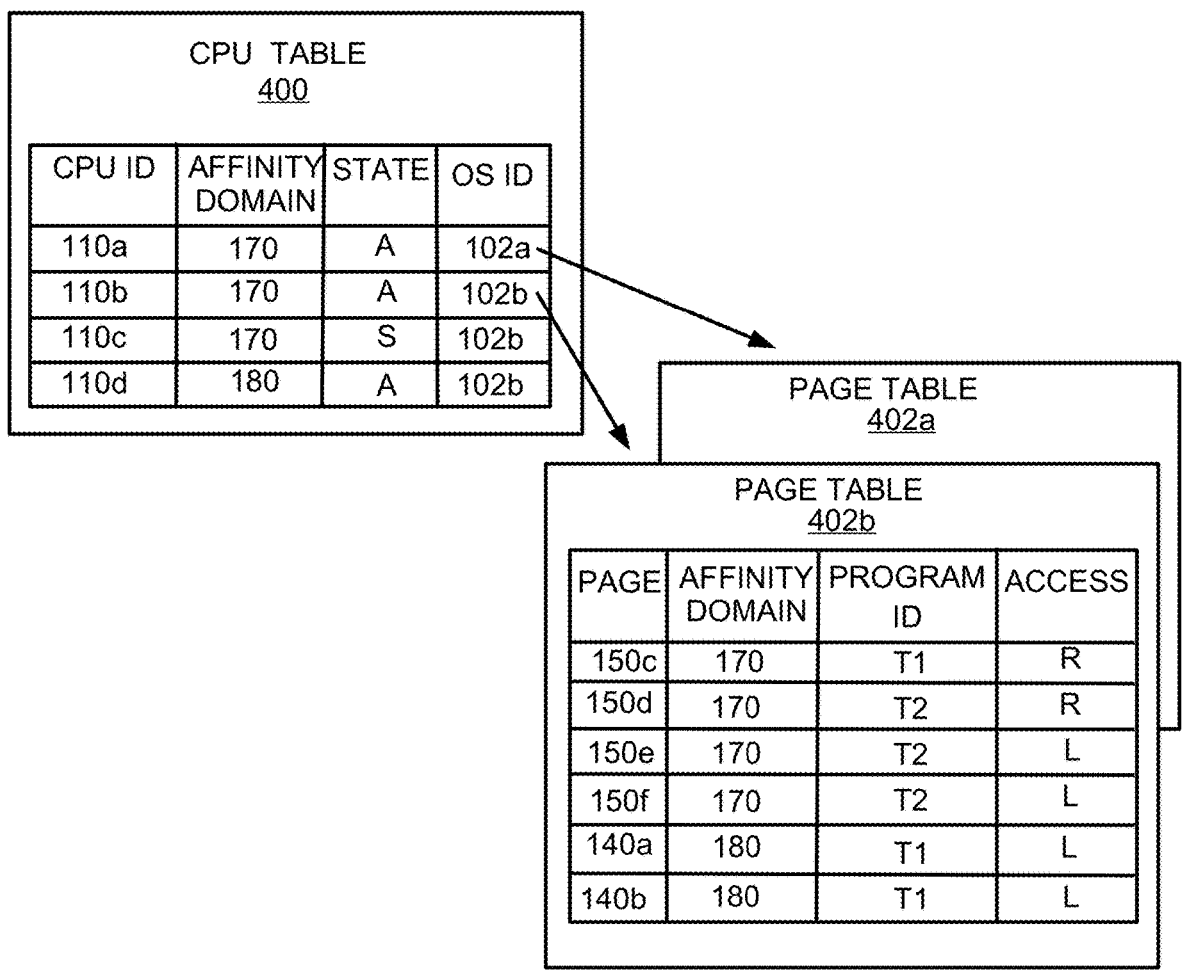
FIG. 4 illustrates conceptual structures particular to selecting memory pages to transfer, according to aspects of the disclosure.

FIG. 4 illustrates conceptual structures that may be used to record information about CPUs, pages, affinity domains or SRADs, OSes, or program threads in the manner of the disclosure. A CPU table 400 may record an affinity domain associated with a set of CPUs included in a computer. For purposes of understanding the disclosure, an "affinity domain" may be an affinity domain as defined in the disclosure, or may be an SRAD. In some embodiments, a CPU table may include an affinity domain as defined in the disclosure, an SRAD, or both (e.g., including an SRAD in a column, not shown, of a CPU Table 400).

A CPU table 400 may also record the ID of an OS to which the CPU is allocated, such as CPU 110a allocated to OS ID 102a, and CPUs 110b, 110c, and 110d allocated to OS ID 102b. Alternatively, CPU table 400 may record a program ID (not shown) to which the CPU is allocated, and may include an OS ID, a program ID, or both (e.g., including a program ID in a column, not shown, of a CPU Table 400). The CPU table 400 may also record a state associated with a CPU, and which may include CPU states such as Active (A) or Suspended (S). For example, CPU table 400 records CPUs 110a, 110b, and 110d in an Active state (A), whereas CPU 110c is recorded in a Suspended state (S). In embodiments a transfer agent may use a CPU table 400 to determine in which affinity domain (or, SRAD) a CPU is included, to which OS a CPU is allocated, or in which state the CPU is operating.

An embodiment may include a page table 402a or 402b (collectively, page tables 402) describing elements of a computer associated with a memory page. As illustrated in detail in page table 402b, a page table may include a set of pages (e.g., 150c through 150f, 140a, and 140b), and for each page the page table 402b may record the identity of an affinity domain (or, SRAD, or both) in which the page is included. In some embodiments a page table, such as page table 402b, may include an affinity domain as defined in the disclosure, an SRAD, or both (e.g., including an SRAD in a column, not shown, of a page table 402b).

A page table 402b may record the identity of a program that most recently accessed a particular page included in the page table. A program, in the context of page table 402b, may include an OS, a program, or a program thread. A page table 402b may record that the access by a program was "local", from a suspended CPU within the affinity domain (or, SRAD) that includes the page. Alternatively, a page table 402b may record that the access by a program was "remote", from a CPU outside of the affinity domain (or, SRAD) of the page. In an embodiment a page table 402b may be provided for each OS operating in a computer, such as page table 402b provided for OS 102b and page table 402a provided for OS 102a. Each of page tables 402a and 402b may record information with regard to memory pages allocated to that particular OS 102a or 102b, respectively.

An embodiment may use structures such as or similar to those shown in FIG. 4 to identify pages to transfer to one or more page repositories, in the manner of the disclosure. It would be evident to one of ordinary skill in the art that the component information of the structures illustrated in FIG. 4 are of a conceptual nature and may be embodied in a variety of programming or hardware structures suitable for associating the components of the tables illustrated, including a single structure or table that may include all the unique elements as they are associated with each other.

Figure 5:
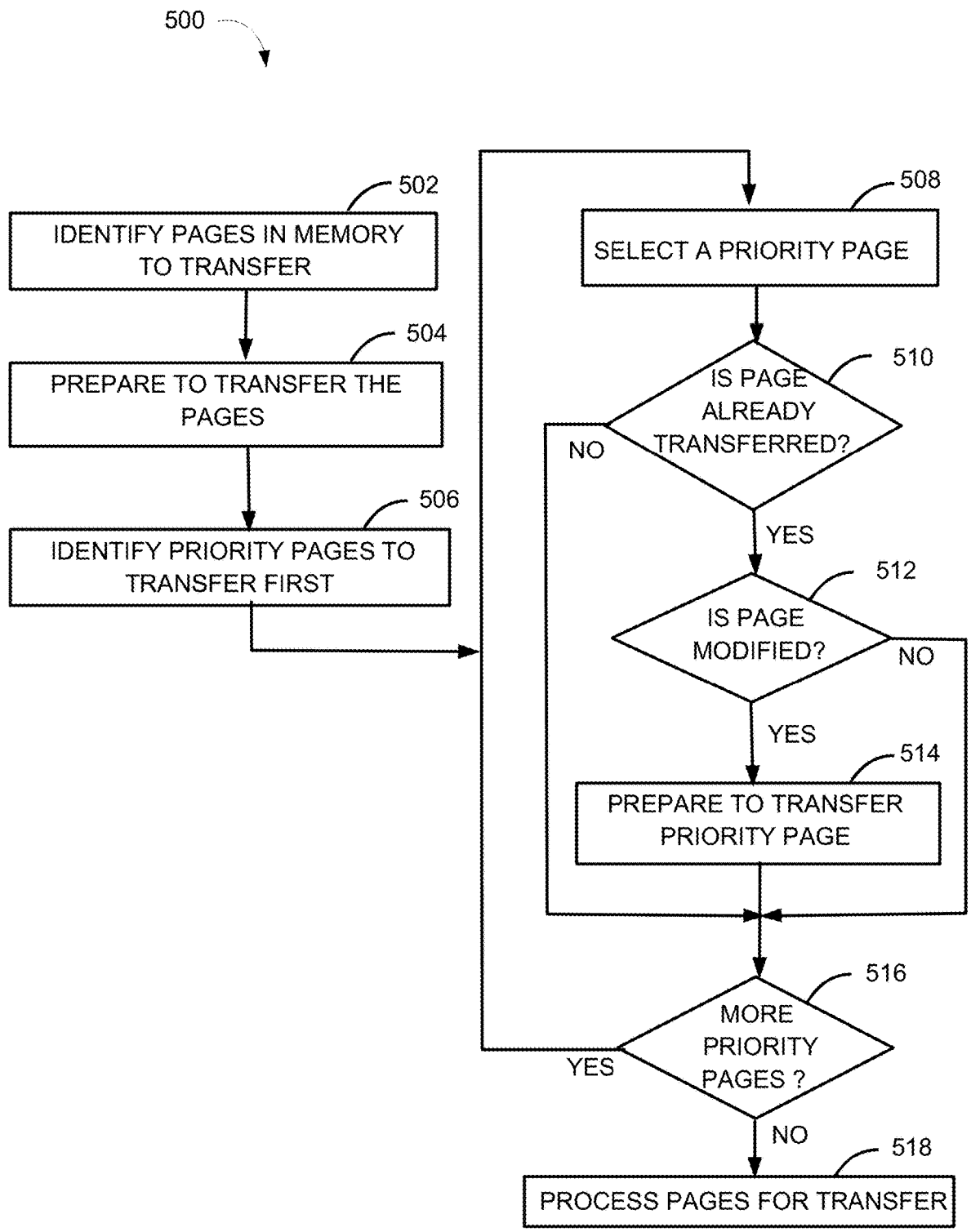
FIG. 5 is a flowchart illustrating an example method to prepare to transfer memory pages in a priority list prior to transferring memory pages in a transfer list, according to aspects of the disclosure.

FIG. 5 exemplifies a method 500 to identify pages to transfer from a memory to one or more page repositories, according to the manner of the disclosure. For purposes of illustrating the disclosure, and in embodiments, a transfer agent may perform the method. A transfer agent may include components of a firmware program, a hypervisor, or an OS; or, a transfer agent may include components of any or all of these. Embodiments may perform the method to transfer memory pages to various embodiments of a page repository, such as other pages in the same or other memory of a computer; another computer, or components thereof; or, another OS operating in the same or another computer. A page repository may be some other element or component of or coupled to a computer, such as an IO adapter, a virtualized IO adapter or IO device, or a network interface.

At 502 of method 500 the transfer agent identifies a "transfer set" of pages in a memory to transfer to a page repository. In embodiments the transfer set may include pages to page-out to a paging repository, such as in an AMS or virtual memory operation, or may include pages to transfer to a migration repository, such as in a workload migration or an LM operation. Pages within the transfer set may be allocated to a program (e.g., an OS or a program thread), and the program may continue to execute and may access or modify those pages.

At 504 the transfer agent prepares to transfer pages in the transfer set. Preparing to transfer pages may include scheduling the pages in the transfer set for transfer at a later time, or may include beginning to actually transfer the pages in the transfer set. A transfer agent may order pages in the transfer set, with respect to each other, for transfer. For example, the transfer agent may order pages for transfer in order of ascending page address, in LRU order, or in LFU order. A transfer agent may at 504 record the pages comprising the transfer set in a data structure (e.g., a list of transfer pages) and, in the data structure, may order the pages for transfer with respect to each other.

At 506 the transfer agent identifies a "priority set" of pages within the memory to transfer prior to transferring pages in the transfer set. The pages in the priority set may be pages less likely, as compared to pages in the transfer set identified at 502, to be modified prior to transferring to a page repository. A transfer agent may, at 506, record the priority pages in a data structure, such as a list (e.g., a priority page list). In some embodiments, pages in a transfer set and pages in a priority set may be identified for transfer to different page repositories, such as pages in the transfer set to transfer to a first page repository and pages in the priority set pages to transfer to a second page repository. For example, pages in the transfer set may be pages to transfer to a paging repository, to make the memory pages available to another program or OS, such as in a virtual memory or memory sharing (e.g., AMS) operation. Pages identified as priority pages may be pages to transfer to a second computer in a memory migration operation included in a partition (e.g., LM) or workload migration.

In embodiments, transferring the priority pages may remove the need to transfer some or all of the pages in the transfer set identified at 502. In the foregoing example, transferring the priority (LM) pages before the pages in the transfer set (AMS pages), the memory pages occupied by the priority pages may become available for memory sharing, such that some or all of the pages scheduled to page-out for memory sharing (e.g., pages in the transfer set) need not then be transferred to a paging repository.

The priority set may include pages within the transfer set identified at 502 to transfer to the same page repository. For example, a transfer agent may identify priority pages from among pages in the transfer set are in the same affinity domain as an affinity domain having a CPU in a suspended state, and in which the page was last accessed by a program that is idle (e.g., not executing). The transfer agent may identify pages to include in the priority set from among pages in the transfer set that were last accessed by a program, in which the program is executing on a CPU in an affinity domain different from that which includes the page.

A transfer agent may, at 506, order pages for transfer within a priority set. For example, the priority pages may have relative priorities with respect to each other, such as some priority pages having "priority one" (first to transfer), and other priority pages having "priority two" (e.g., pages that may be transferred subsequent to priority one pages). A transfer agent may identify a page last referenced by an idle program as a priority one page, and may identify a page last referenced by a program executing on a CPU in a different affinity domain than that page to be a priority two page. In other embodiments a transfer agent may select a particular page from pages within a priority page list according to other criteria such as LRU or LFU relative to other pages in the priority set.

At 508 the transfer agent selects a priority page to transfer to a page repository. At 510 the transfer agent determines if the page selected at 508 has been already transferred. For example, the priority page selected at 508 may be included in a transfer set and, as a result of 504, the transfer agent, or a component of the computer, may have already transferred the priority page. If at 510 the transfer agent determines that the selected priority page has not already been transferred, the transfer agent at 514 prepares the transfer of the selected priority page to occur prior to transferring pages prepared for transfer at 504. Preparing to transfer the priority page may include scheduling the transfer of the page for a later time, or may include actually transferring the page.

Alternatively, if at 510 the transfer agent determines that the selected priority page has already been transferred, at 512 the transfer agent determines whether or not the selected priority page (from 508) has been modified since the time it had been transferred. If the priority page has been modified, then at 514 the transfer agent prepares to transfer the modified priority page again. If at 512 the transfer agent determines that the priority page has not been modified, the transfer agent at 514 prepares the priority page for transfer. If the priority page is included in the transfer set, the transfer agent may, at 514, remove the priority page from the transfer set.

At 516 the transfer agent determines if there are other pages remaining in the priority set to transfer. If so, the transfer agent returns to 508, selects another priority page from the priority set, and at 510 to 514 processes the selected priority page. If at 516 the transfer agent determines that there are no more priority pages remaining in the priority set, the transfer agent at 518 completes processing the transfer of pages in the priority or transfer set. Processing the transfer of the pages at 518 may include actually transferring the pages, or may include scheduling the pages for transfer at a later time.

While the disclosure of FIG. 5 illustrates a transfer agent performing the method 500, the method is not limited to, nor is the disclosure intended to limit the method to, performance by a transfer agent as defined in the disclosure. It would be apparent to one of ordinary skill in the art that a variety of elements or components of a computer, in the manner of the disclosure, individually or in combination, may perform the method 500.

Figure 6:
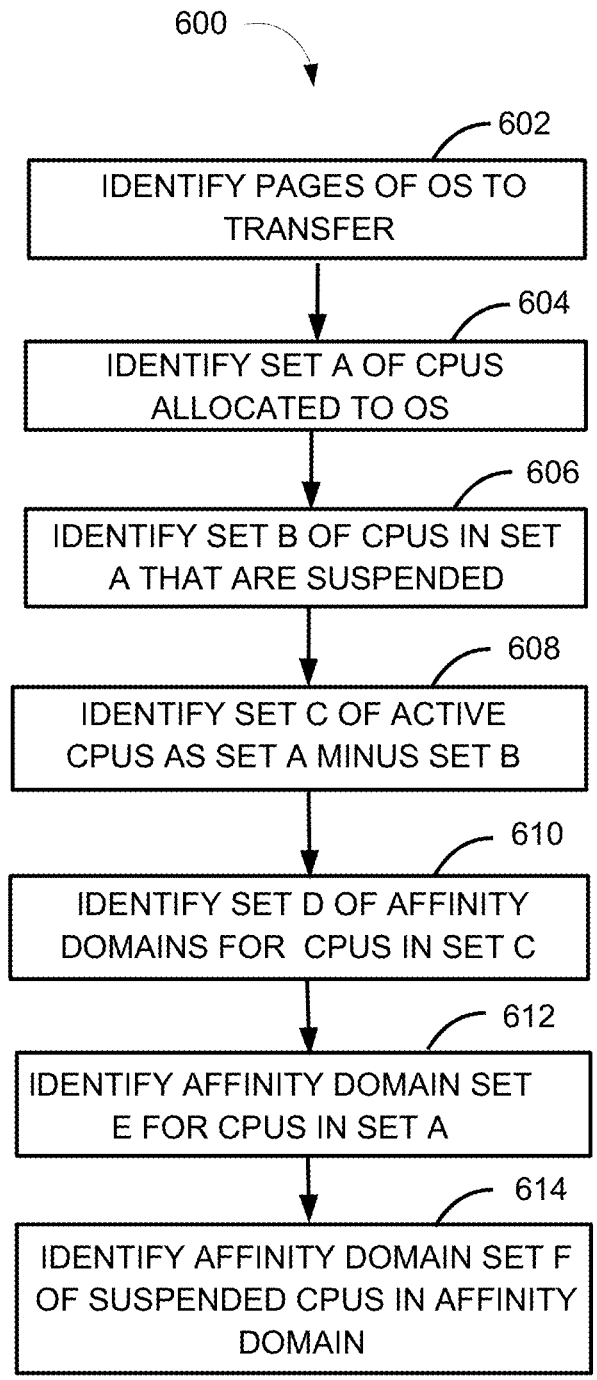
FIG. 6 is a flowchart illustrating an example method to determine a set of suspended CPUs, according to aspects of the disclosure.

FIG. 6 illustrates an example method 600, according to features of the disclosure, to identify a set of affinity domains having CPUs in a suspended state. Affinity domains, in the example method 600, may be affinity domains as defined in the disclosure, or may be SRADs. The method of FIG. 6 may be suitable in an embodiment to identify priority pages to transfer to page repositories in the manner of the disclosure. For purposes of illustration, and in embodiments of the disclosure, a transfer agent may perform the method 600.

At 602 of method 600 the transfer agent identifies a transfer set of memory pages to transfer to a page repository and determines that pages in the transfer set are allocated to an OS. At 604 the transfer agent determines a "set A" comprising CPUs also allocated to the OS. At 604, the transfer agent may alternatively determine that the CPUs are allocated to a particular program or program thread of the OS, or may be allocated to any particular program executing in the computer, including a program executing in firmware or a hypervisor. For purposes of illustrating method 600 according to the features of the disclosure, "OS" is representative of any of the foregoing types of programs.

At 606 the transfer agent identifies a "set B" that has as members CPUs from set A that are in a suspended (e.g., folded) state. At 608 the transfer agent further identifies a "set C" that has as members CPUs allocated to the OS that are not suspended. Set C may be computed as the set difference of set A (CPUs allocated to the OS) minus set B (CPUs allocated to the OS that are in a suspended state). At 610 the transfer agent may identify a "set D" that has as members affinity domains that include CPUs in set C. Continuing at 612, the transfer agent identifies a set E that has as members affinity domains of the set A CPUs (all CPUs allocated to the OS). At 614 the transfer agent identifies a set F that has as members affinity domains of the suspended CPUs in set B. The set F may be computed as the set difference of set E minus set D.

While the disclosure of FIG. 6 illustrates a transfer agent performing the method 600, the method is not limited to, nor is the disclosure intended to limit the method to, performance by a transfer agent as defined in the disclosure. It would be apparent to one of ordinary skill in the art that a variety of elements or components of a computer, in the manner of the disclosure, individually or in combination, may perform the method 600.

Figure 7:
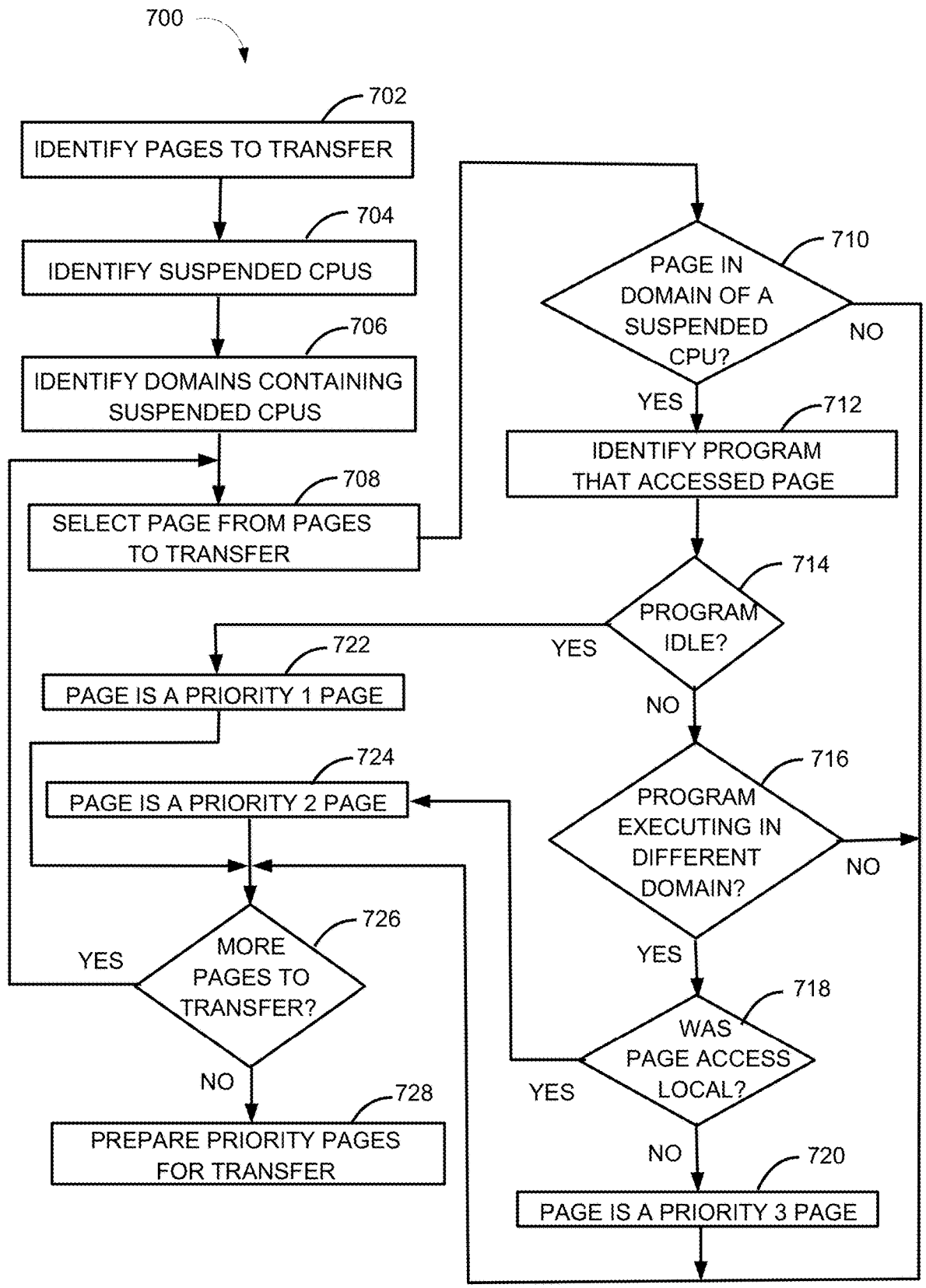
FIG. 7 is a flowchart illustrating an example method to identify memory pages to include in a priority set of memory pages to transfer to a page repository, according to aspects of the disclosure.

FIG. 7 illustrates an example method 700 to identify a set of priority pages to transfer to a page repository in the manner of the disclosure. For purposes of illustration, and in embodiments of the disclosure, a transfer agent may perform of the method 700.

At 702 a transfer agent identifies a first set of memory pages to transfer to a page repository. A transfer agent may identify pages to include in the first set in the manner disclosed in reference to 502 of FIG. 5. At 704 the transfer agent identifies a set of suspended CPUs and, at 706, the transfer agent identifies affinity domains containing the suspended CPUs. A transfer agent may use the method 600, or aspects thereof, to determine suspended CPUs and affinity domains including them. Affinity domains, in the example method 700, may be affinity domains as defined in the disclosure, or may be SRADs.

At 708 through 724 the transfer agent determines if one or more pages in the first set may be priority pages in the manner of the disclosure. At 708 the transfer agent selects a page from the first set of memory pages. At 710 the transfer agent determines whether or not the selected page is in an affinity domain of a suspended CPU, such as an affinity domain identified at 706. If the selected page is not in an affinity domain having a suspended CPU, the transfer agent, at 710, determines that the selected page is not a priority page and proceeds, at 726, to determine if there are additional pages to transfer. If, on the other hand, the selected page is in an affinity domain having a suspended CPU, the transfer agent, at 712, determines the identity of a program that last accessed the selected page. At 714 the transfer agent determines whether the identified program is idle or not. At 712 the transfer agent may, alternatively, determine that no program has accessed the selected page and, accordingly, at 722, may include the selected page in a set of "priority one" pages.

If the transfer agent determines, at 714, that the program from 712 is now in an idle state (e.g., not executing, or dispatched to execute, on any CPU), the transfer agent, at 722, includes the selected page in a set of "priority one" pages. If the program from 712 is not idle, at 716 the transfer agent further determines if the program identified at 712 is executing (or, may be dispatched to execute and execution is yet pending) on a CPU in the affinity domain that includes the page selected at 708. If the program is executing (or, dispatched to execute) on a processor in the same affinity domain as the selected page, the transfer agent, at 716, determines that the selected page is not a priority page and at 726 determines if there are more pages to transfer.

If, instead, at 716, the transfer agent determines that the program from 712 is executing (or, may be dispatched to execute and execution is yet pending) on a CPU in an affinity domain other than that which includes the page from 708, at 718 the transfer agent determines if the program last accessed the selected page using a CPU in the same affinity domain as the selected page (i.e., the access was "local"). If the access was local the transfer agent, at 724, includes the selected page in a set of "priority two" pages. If, on the other hand, the access was not local, at 720 the transfer agent includes the selected page in a set of "priority three" pages.

At 726 the transfer agent determines if there are pages remaining in the transfer set to process according to the method 700. If so, the transfer agent returns to 708 to select a new page from among those remaining and process that page according to 710 through 724. If the transfer agent determines, at 726, that there are no pages remaining to process, at 728 the transfer agent prepares transfer of priority pages to precede transfer of other pages in the first set of memory pages from 702.

In preparing pages for transfer to a page repository a transfer agent may determine that transfer of priority pages should precede transfer of other pages in a set of pages to transfer, and may prepare transfer of the priority pages accordingly. A transfer agent may prepare transfer of priority one pages to precede transfer of priority two pages, and may prepare transfer of priority two pages to precede transfer of priority three pages. The method of FIG. 7 may be suitable to an embodiment in the manner of the disclosure, to identify priority pages to transfer in an LM operation, to transfer in an AMS operation, or to transfer in a combination of such operations occurring concurrently or sequentially within a computer.

It would be evident to one of ordinary skill in the art as long a program continues to operate (e.g., has not terminated, whether or not the program is idle), a page selected at 708 and transferred as a result of 728 (or transferred as a result of 518 of method 500 in FIG. 5), may be later modified by the program. A transfer agent may, accordingly, need to detect such modification and may need to repeat the transfer of that page.

Figure 8:
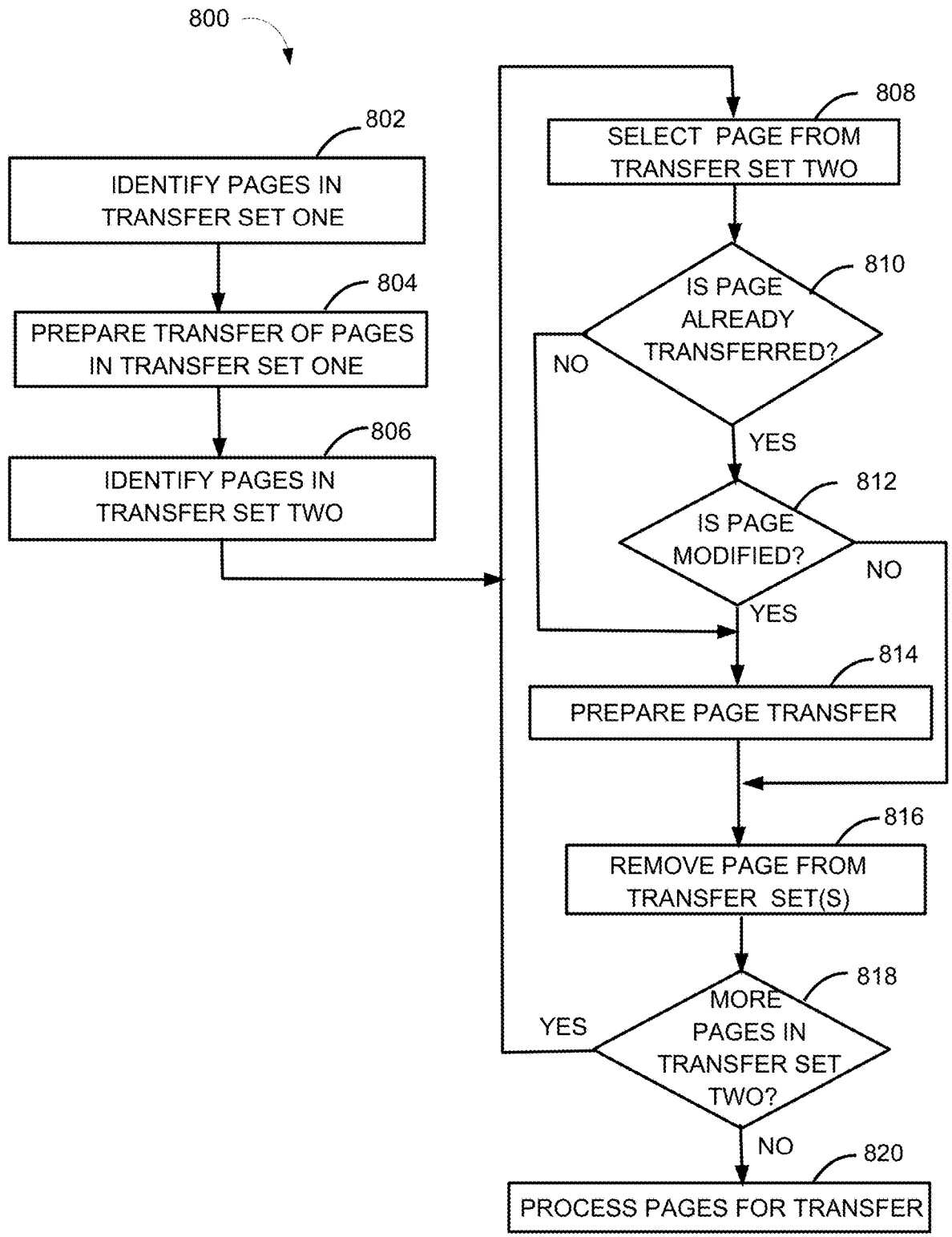
FIG. 8 is a flowchart illustrating an example method to identify memory pages to include in a priority set among memory pages to transfer to two page repositories, according to aspects of the disclosure.

FIG. 8 illustrates an example method 800 to identify sets of pages to transfer to a plurality of page repositories, in the manner of the disclosure. For purposes of illustration, and in embodiments of the disclosure, a transfer agent may perform of the method 800.

At 802 the transfer agent identifies a "transfer set one" of pages in a memory to transfer to a first page repository. Various embodiments may identify the pages to transfer to the first repository for a variety of purposes, such as disclosed previously. In some embodiments the pages may be identified as pages to transfer to make the memory page available in an AMS or virtual memory operation. In other embodiments the pages may be identified as pages to transfer to checkpoint or suspend an OS or program. The pages included in the transfer set one may be allocated to a program that may modify those pages.

At 804 the transfer agent prepares the transfer of pages in the transfer set one to the first page repository. Preparing the transfer of the pages may include scheduling transfer of a page for a later time, or may include initiating the actual transfer of a page. Preparing to transfer a page may include inserting the page into a list of pages that a component of a computer may operate on to transfer pages.

At 806 a transfer agent identifies a "transfer set two" of pages in a memory to transfer to a second page repository. Various embodiments may identify the pages to transfer to the second repository for a variety of purposes, such as disclosed previously. In some embodiments the pages may be identified as pages to transfer in an LM operation. In other embodiments the pages may be identified as pages to transfer to checkpoint or suspend an OS or program. Pages included in the transfer set two may be included also in transfer set one. Pages included in the transfer set two may be allocated to a program that may modify those pages.

At 808 the transfer agent determines that pages in transfer set two may be transferred to the second page repository prior to transferring pages in transfer set one to the first page repository. Accordingly, at 808 the transfer agent selects a page from transfer set two. At 810 the transfer agent determines whether or not the selected page has already been transferred to the second page repository (e.g., as having been already transferred prior to commencing 808). If not, at 814 the transfer agent prepares the page for transfer.

If, at 810, the transfer agent determines, instead, that the selected page has already been transferred to the second page repository, at 812 the transfer agent determines whether or not the selected page has been modified since the time it had been transferred. If the selected page has not been modified, at 816 the transfer agent removes the selected page from transfer set two. If the selected page is included also in the transfer set one, at 816 the transfer agent may also remove the selected page from transfer set one. For example, the selected page may be included in transfer set two to transfer to the second repository in an LM operation, and may also be included in transfer set one to transfer to the first page repository as part of an AMS operation.

If, at 812, the transfer agent determines that the selected page has been modified, at 814 the transfer agent prepares transfer of the selected page to the second page repository. At 814 the transfer agent may prepare transfer of the pages in transfer set two to occur in a particular order. For example, the transfer agent may order the transfer of the pages according to a relative memory page address, a LRU metric, or an LFU metric. A transfer agent may order the transfer of the selected page according to the methods of the disclosure. If the selected page is included also in the transfer set one, at 816 the transfer agent may also remove the selected page from transfer set one.

At 818, the transfer agent determines if there are more pages remaining in transfer set two to process according to 810 through 816. If so, the transfer agent returns to 808 and at 808 selects another page from those included in transfer set two and processes the selected page according to 810 through 816. If, at 818, the transfer agent determines that there are no more pages remaining in transfer set two to process, at 820 the transfer agent processes pages prepared for transfer at 804 and 814. Processing, at 820, may include actually transferring page in transfer set two and then actually transferring pages remaining in transfer set one. Processing, at 820, may also include scheduling the transfer of pages in transfer set two to occur prior to transfer of pages in transfer set one. A transfer agent may order the transfer of the selected page according to the methods of the disclosure.

Also at 820, a transfer agent may determine that pages in transfer set two that are prepared for transfer, or actually being transferred, to the second page repository may remove the need to transfer one or more pages included in transfer set one. Accordingly, the transfer agent may determine to not transfer one or more pages in transfer set one to the first page repository and may remove those pages from transfer set one. For example, pages included in transfer set one may be pages to transfer in an AMS operation. Pages in transfer set two may include, for example, pages to transfer in an LM operation. Transferring pages in transfer set two may make alternative pages available in the memory for the AMS operation and, correspondingly, a transfer agent may remove pages in transfer set one that are pages to transfer in an AMS operation.

The structures and methods of the disclosure are illustrative of the manner of embodiments of the disclosure involving a plurality of page repositories. However, these are not intended to limit embodiments to only two page repositories. Rather, it would be apparent to one of ordinary skill in the art that other embodiments in the manner of the disclosure may incorporate more than two page repositories, and the manner in which to accordingly modify the embodiments according to aspects of the disclosure.

Figure 9:
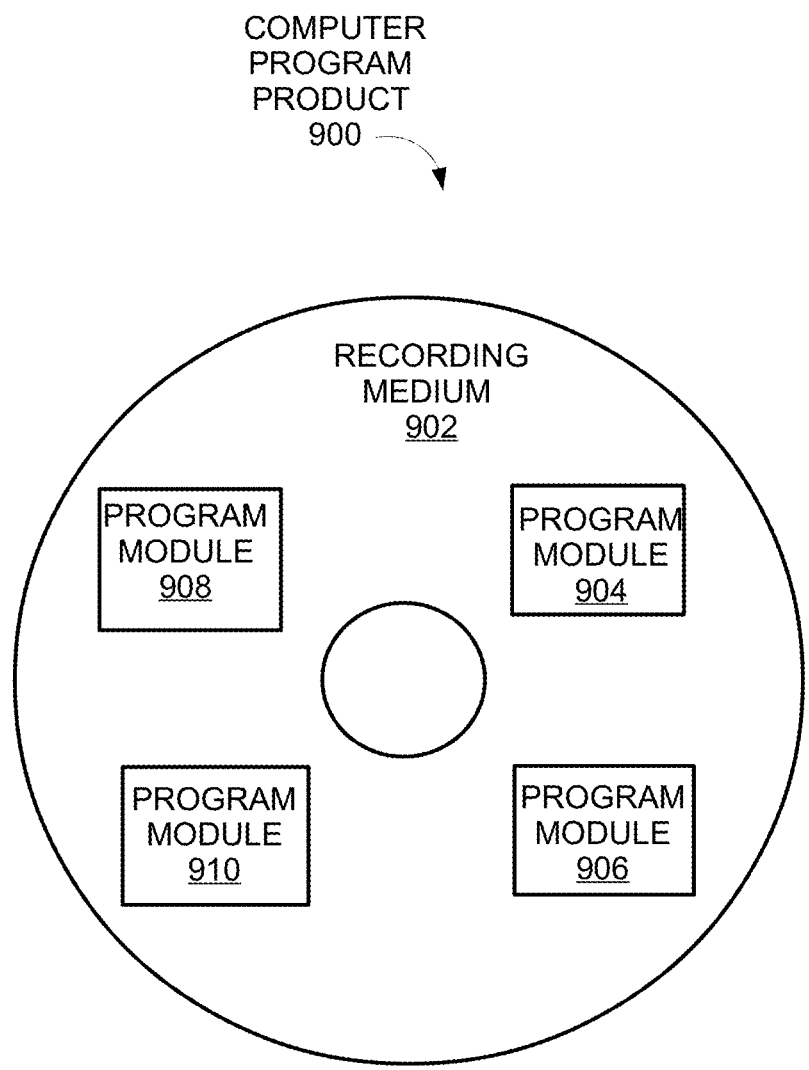
FIG. 9 is a block diagram illustrating a computer program product that may implement features of the disclosure.

FIG. 9 depicts an article of manufacture or computer program product 900 that is an embodiment of the disclosure. The computer program product 900 may include a recording medium 902, and the recording medium 902 may store program modules 904, 906, 908, and 910 for a computer to carry out the aspects of the disclosure. The recording medium 902 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 904, 906, 908, or 910 may direct a computer to implement the aspects of the disclosure including, but not limited to, the structures and methods illustrated in the disclosure.

The disclosure may be a system, a method, and/or a computer program product at any possible technical detail level of integration. The computer program product may include a computer readable storage medium (or media) having computer readable program instructions thereon for causing a processor to carry out aspects of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for transferring memory pages, the method comprising:
   identifying a first set of memory pages included in a memory to transfer to a first page repository, the first set of memory pages including a first memory page, the first memory page included in a memory sharing operation;
   identifying a second set of memory pages included in the memory to transfer to a second page repository, the second set of memory pages including a second memory page, the second memory page included in a memory migration operation;
   determining that the second memory page may be transferred to the second page repository prior to the first memory page transferring to the first page repository, the determining based on the second memory page included in the memory migration operation and the first memory page included in the memory sharing operation and the determining based on one or more characteristics of a first affinity domain that the first set of memory pages is included within, where the first affinity domain consists of one or more processors and one or more pages of memory, and based on one or more characteristics of a second affinity domain that the second set of memory pages is included within, where the second affinity domain consists of one or more processors and one or more pages of memory; and
   preparing transfer of second memory page to occur prior to transfer of the first memory page.

2. The method of claim 1 wherein the method is performed by at least one of a firmware program, an operating system, a hypervisor, DMA hardware, and a virtualized device.

3. The method of claim 1 wherein the first page repository includes at least one of the memory, a storage medium, an IO adapter, a device included in or coupled to an IO adapter, a virtualized IO adapter or device, a network attached storage device, an operating system, and a second computer.

4. The method of claim 1 wherein the second page repository includes at least one of the memory, a storage medium, an IO adapter, a device included in or coupled to an IO adapter, a virtualized IO adapter or device, a network attached storage device, an operating system, and a second computer.

5. The method of claim 1 further comprising:
   determining that transferring the second memory page removes the need to transfer the first memory page, the determining based on transferring the second memory page making the second memory page available in the memory for the memory sharing operation; and
   removing the first memory page from the first set of memory pages to transfer.

6. The method of claim 5 wherein the method is performed by at least one of a firmware program, an operating system, a hypervisor, DMA hardware, and a virtualized device.

7. The method of claim 1, wherein the determining that the second memory page may be transferred prior is additionally based on one or more characteristics of a first scheduler resource allocation domain that the first set of memory pages is included within, wherein the first scheduler resource allocation domain consists of one processor and one or more pages of memory within an affinity domain having that processor, and based on one or more characteristics of a second scheduler resource allocation domain (SRAD) that the second set of memory pages is included within, wherein the second scheduler resource allocation domain consists of one processor and one or more pages of memory within an affinity domain having that processor.

8. A computer program product for transferring memory pages, the computer program product comprising a computer readable storage medium having program instructions embodied therewith, the program instructions executable by a computer to perform a method comprising:
   identifying, by the computer, a first set of memory pages included in a memory to transfer to a first page repository, the first set of memory pages including a first memory page, the first memory page included in a memory sharing operation;
   identifying, by the computer, a second set of memory pages included in the memory to transfer to a second page repository, the second set of memory pages including a second memory page, the second memory page included in a memory migration operation;
   determining, by the computer, that the second memory page may be transferred to the second page repository prior to the first memory page transferring to the first page repository, the determining based on the second memory page included in the memory migration operation and the first memory page included in the memory sharing operation and the determining based on one or more characteristics of a first affinity domain that the first set of memory pages is included within, where the first affinity domain consists of one or more processors and one or more pages of memory, and based on one or more characteristics of a second affinity domain that the second set of memory pages is included within, where the second affinity domain consists of one or more processors and one or more pages of memory; and
   preparing, by the computer, transfer of second memory page to occur prior to transfer of the first memory page.

9. The computer program product of claim 8, wherein the method is performed, by the computer, using at least one of a firmware program, an operating system, a hypervisor, DMA hardware, and a virtualized device.

10. The computer program product of claim 8, wherein the first page repository includes at least one of the memory, a storage medium, an TO adapter, a device included in or coupled to an TO adapter, a virtualized TO adapter or device, a network attached storage device, an operating system, and a second computer.

11. The computer program product of claim 8, wherein the second page repository includes at least one of the memory, a storage medium, an TO adapter, a device included in or coupled to an TO adapter, a virtualized TO adapter or device, a network attached storage device, an operating system, and a second computer.

12. The computer program product of claim 8, the method further comprising:
   determining, by the computer, that transferring the second memory page removes the need to transfer the first memory page, the determining based on transferring the second memory page making the second memory page available in the memory for the memory sharing operation; and
   removing, by the computer, the first memory page from the first set of memory pages to transfer.

13. The computer program product of claim 12, wherein the method is performed, by the computer, using at least one of a firmware program, an operating system, a hypervisor, DMA hardware, and a virtualized device.

14. The computer program product of claim 8, wherein the determining that the second memory page may be transferred prior is additionally based on one or more characteristics of a first scheduler resource allocation domain that the first set of memory pages is included within, wherein the first scheduler resource allocation domain consists of one processor and one or more pages of memory within an affinity domain having that processor, and based on one or more characteristics of a second scheduler resource allocation domain (SRAD) that the second set of memory pages is included within, wherein the second scheduler resource allocation domain consists of one processor and one or more pages of memory within an affinity domain having that processor.

15. A system for performing a method for transferring memory pages, the system comprising:
   a memory; and
   a processor in communication with the memory, wherein the system is configured to perform a method, the method comprising:
   identifying a first set of memory pages included in a memory to transfer to a first page repository, the first set of memory pages including a first memory page, the first memory page included in a memory sharing operation;
   identifying a second set of memory pages included in the memory to transfer to a second page repository, the second set of memory pages including a second memory page, the second memory page included in a memory migration operation;
   determining that the second memory page may be transferred to the second page repository prior to the first memory page transferring to the first page repository, the determining based on the second memory page included in the memory migration operation and the first memory page included in the memory sharing operation and the determining based on one or more characteristics of a first affinity domain that the first set of memory pages is included within, where the first affinity domain consists of one or more processors and one or more pages of memory, and based on one or more characteristics of a second affinity domain that the second set of memory pages is included within, where the second affinity domain consists of one or more processors and one or more pages of memory; and
   preparing transfer of second memory page to occur prior to transfer of the first memory pages.

16. The system of claim 15 wherein the method is performed by at least one of a firmware program, an operating system, a hypervisor, DMA hardware, and a virtualized device.

17. The system of claim 15 wherein the first page repository includes at least one of the memory, a storage medium, an IO adapter, a device included in or coupled to an IO adapter, a virtualized IO adapter or device, a network attached storage device, an operating system, and a second computer.

18. The system of claim 15 wherein the second page repository includes at least one of the memory, a storage medium, an IO adapter, a device included in or coupled to an IO adapter, a virtualized IO adapter or device, a network attached storage device, an operating system, and a second computer.

19. The system of claim 15, the method further comprising:
   determining that transferring the second memory page removes the need to transfer the first memory page, the determining based on transferring the second memory page making the second memory page available in the memory for the memory sharing operation; and
   removing the first memory page from the first set of memory pages to transfer.

20. The system of claim 19 wherein the method is performed by at least one of a firmware program, an operating system, a hypervisor, DMA hardware, and a virtualized device.

* * * * *